(12) United States Patent
Song et al.

(10) Patent No.: US 9,279,989 B2
(45) Date of Patent: Mar. 8, 2016

(54) BACKLIGHT UNIT, 3D DISPLAY HAVING THE SAME, AND METHOD OF FORMING 3D IMAGE

(75) Inventors: Hoon Song, Yongin-si (KR); Yoon-sun Choi, Yongin-si (KR); Hong-seok Lee, Seongnam-si (KR); Jung-mok Bae, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1014 days.

(21) Appl. No.: 13/075,913

(22) Filed: Mar. 30, 2011

(65) Prior Publication Data
US 2011/0242150 A1 Oct. 6, 2011

(30) Foreign Application Priority Data

Mar. 31, 2010 (KR) .................. 10-2010-0029351

(51) Int. Cl.
*G09G 5/02* (2006.01)
*G02B 27/22* (2006.01)
*H04N 13/04* (2006.01)

(52) U.S. Cl.
CPC ........ *G02B 27/2214* (2013.01); *H04N 13/0418* (2013.01); *H04N 13/0468* (2013.01)

(58) Field of Classification Search
CPC ........... G02B 27/2214; G02B 27/2264; G02B 27/225; G02B 26/005; H04N 13/0404; H04N 13/0418; H04N 13/0409
USPC .......... 359/462, 359; 345/102, 697, 690, 664, 345/7, 204, 173, 32, 156, 211, 419; 348/51; 313/438; 349/61; 315/15
See application file for complete search history.

(56) References Cited

U.S. PATENT DOCUMENTS

| | | | |
|---|---|---|---|
| 5,132,839 A * | 7/1992 | Travis | 359/462 |
| 7,586,681 B2 * | 9/2009 | Cernasov | 359/464 |
| 7,688,509 B2 * | 3/2010 | Vissenberg et al. | 359/463 |
| 8,139,104 B2 * | 3/2012 | Vos et al. | 348/51 |
| 8,514,272 B2 * | 8/2013 | Reichelt | 348/51 |
| 8,558,853 B2 * | 10/2013 | Sagardoyburu et al. | 345/690 |
| 2003/0067539 A1 * | 4/2003 | Doerfel | G02B 6/0043 348/51 |
| 2003/0085850 A1 * | 5/2003 | Feenstra et al. | 345/32 |
| 2004/0239231 A1 * | 12/2004 | Miyagawa et al. | 313/438 |
| 2005/0117016 A1 * | 6/2005 | Surman | 348/51 |
| 2006/0158729 A1 * | 7/2006 | Vissenberg et al. | 359/462 |
| 2006/0279567 A1 * | 12/2006 | Schwerdtner et al. | 345/419 |
| 2007/0018585 A1 * | 1/2007 | Ijzerman | G09F 19/14 315/15 |
| 2007/0035672 A1 * | 2/2007 | Shestak et al. | 349/15 |
| 2007/0200792 A1 * | 8/2007 | Kim | H04N 13/0411 345/7 |
| 2008/0007511 A1 * | 1/2008 | Tsuboi et al. | 345/102 |
| 2008/0117231 A1 * | 5/2008 | Kimpe | G09G 3/20 345/629 |
| 2008/0123182 A1 * | 5/2008 | Cernasov | 359/359 |

(Continued)

FOREIGN PATENT DOCUMENTS

| | | |
|---|---|---|
| JP | 2008-287180 | 11/2008 |
| KR | 10-2007-0019968 | 2/2007 |

(Continued)

*Primary Examiner* — Thuy Pardo
(74) *Attorney, Agent, or Firm* — NSIP Law

(57) ABSTRACT

A backlight unit of a three-dimensional (3D) display has a plurality of cells and a 3D image is formed by adjusting directions of light emitted from the cells. The backlight unit includes an emission unit that adjusts an emission direction of light from a cell with respect to other cells. The backlight unit divides view areas to provide left-eye and right-eye images, thereby generating a 3D image.

22 Claims, 8 Drawing Sheets

(56) References Cited

U.S. PATENT DOCUMENTS

| | | | | |
|---|---|---|---|---|
| 2008/0259634 | A1* | 10/2008 | Mi et al. | 362/606 |
| 2008/0316302 | A1* | 12/2008 | Vos et al. | 348/51 |
| 2009/0213147 | A1* | 8/2009 | Sagardoyburu et al. | 345/690 |
| 2009/0244414 | A1 | 10/2009 | Hu et al. | |
| 2010/0157026 | A1* | 6/2010 | Reichelt | 348/51 |
| 2010/0214634 | A1* | 8/2010 | Kroll | G02B 5/045 359/9 |
| 2011/0157257 | A1* | 6/2011 | Bennett | G06F 3/14 345/690 |
| 2012/0019529 | A1* | 1/2012 | Kimpe | G09G 9/20 345/419 |
| 2012/0268435 | A1* | 10/2012 | Hoshi | G02B 5/3083 345/204 |
| 2013/0114019 | A1* | 5/2013 | Ijzerman | G09F 19/14 349/61 |

FOREIGN PATENT DOCUMENTS

| | | |
|---|---|---|
| KR | 10-2007-0031261 | 3/2007 |
| KR | 10-2008-0024901 | 3/2008 |
| KR | 10-2008-0029401 | 4/2008 |
| KR | 10-2009-0041303 | 4/2009 |
| WO | WO 2008142156 A2 * | 11/2008 |

* cited by examiner

BACKLIGHT UNIT, 3D DISPLAY HAVING THE SAME, AND METHOD OF FORMING 3D IMAGE

RELATED APPLICATIONS

This application claims priority under 35 U.S.C. 119 to Korean Patent Application No. 10-2010-0029351, filed on Mar. 31, 2010, in the Korean Intellectual Property Office, the disclosure of which is incorporated herein in its entirety by reference.

BACKGROUND

1. Field

The following description relates to a backlight unit, a three-dimensional (3D) display having the same, and a method of forming a 3D image. More particularly, direction of light emitted by the backlight unit may be adjustable.

2. Description of the Related Art

Three-dimensional (3D) images can be formed according to the principle of stereo visualization in a viewer's eyes. An important factor in generating a stereoscopic sensation in 3D images is the binocular parallax which occurs due to the distance between two eyes of the viewer (i.e. about 65 mm). There are generally two different types of conventional three-dimensional (3D) image displays. A first type of 3D image display requires suitable glasses to see 3D images on the display, and a second type of 3D image display does not require glasses to view 3D images. In the second type of 3D image displays, 3D images can be generated by separating right images and left images without using glasses. Techniques for the 3D image displays without 3D glasses include a parallax barrier method and a lenticular method.

In the parallax barrier method, images to be observed by right and left eyes are alternately displayed, where each image has longitudinal patterns, and the images are observed using a very thin longitudinal lattice row, e.g., a barrier. In this way, a longitudinal pattern image for the left eye and a longitudinal pattern image for the right eye are separated by the barrier. The image for the left eye and the image for the right eye have different view points, and thus they are separately observed by the right and left eyes, respectively, to form a stereoscopic image.

In the lenticular method, images corresponding to right and left eyes are disposed on a focal plane of a lenticular lens, and the images are observed through the lenticular lens. The images corresponding to the right and left eyes are divided based on the characteristic of the lenticular lens, and thus they are separately observed by the right and left eyes, respectively, to form a stereoscopic image.

In both the parallax barrier method and the lenticular method, a stereoscopic image viewing area is fixed because a barrier or lens, a focal length, an emission direction, and the like are fixed. For example, a 3D image can be viewed only either in a landscape/horizontal mode or in a portrait/vertical mode of a display in the parallax barrier and lenticular methods. This is because the barrier and lenticular lens are arranged such that only a certain display direction and orientation provides images that the right and left eyes can properly observe in order to form a stereoscopic image.

SUMMARY

In one general aspect, a backlight unit includes a plurality of cells, each of the plurality of cells being adapted to direct light in two or more emission directions, wherein a first image is displayed when the light is directed in one of the two or more emission directions, and wherein a second image is displayed when the light is directed in another of the two or more emission directions.

Each of the plurality of cells may include a plurality of light sources. The plurality of light sources may be arranged in two-dimensional array. Each of the plurality of light sources may be controlled independently.

Each of the plurality of cells includes a plurality of reflection portions, and each of the plurality of light sources may be arranged to correspond to each of the plurality of reflection portions.

The plurality of reflection portions may be arranged on a curved surface.

Each of the plurality of cells further may include a pin hole, wherein the pin hole is disposed in a position above the plurality of light sources.

The pin hole may affect an emission direction of light emitted from each of the plurality of light sources, and each of the emission directions of the plurality of light sources are different from one another.

The backlight units may include at least one light guide plate (LGP), and a light source emitting light into a surface of the light guide plate (LGP). The light guide plate (LGP) may be formed in a wedge shape. Each of the plurality of cells may include a prism array disposed above the light guide plate (LGP). The prism array may include an electric wetting device.

The prism array may include a plurality of prisms, wherein the plurality of prisms are arranged in a two-dimensional manner and each of the plurality of prisms is controlled independently.

Each of the plurality of cells may further include a shutter array disposed above the light guide plate (LGP).

The shutter array may include at least one selected from the group of an electric wetting shutter, a liquid crystal shutter, a frustrated total internal reflection (FTIR) shutter, and any combination thereof.

The prism array may further include a plurality of prisms, wherein the plurality of prisms are arranged in a two-dimensional manner and each of the plurality of prisms is operated independently.

According to another general aspect, a three-dimensional (3D) display includes a backlight unit and a display panel disposed above the backlight unit, wherein the backlight unit includes a plurality of cells, each of the plurality of cells being able to direct light in two or more emission directions, wherein a first image is displayed when the light is directed in a first emission direction of the two or more emission directions, and wherein a second image is displayed when the light is directed in a second emission direction of the two or more emission directions.

Each of the plurality of cells may further include a plurality of light sources, wherein each of the plurality of light sources is controlled independently. Each of the plurality of cells may further include a plurality of reflection portions arranged on a curved surface. Each of the plurality of cells may further include a pin hole, wherein the pin hole affects an emission direction of light emitted from at least one of the plurality of light sources.

The backlight unit may further include a light guide plate (LGP), and the backlight unit may also further include at least one selected from the group of a prism array, a shutter array disposed above the light guide plate (LGP), and any combination thereof. The at least one selected from the group of the prism array, the shutter array, and any combination thereof may include an electric wetting device.

According to another general aspect, a method of forming a three-dimensional (3D) image includes calculating an emission direction of light of each of a plurality of cells in a backlight unit, wherein each of the plurality of cells are adapted to direct light in at least two different emission directions, providing a first image with light directed in one of the at least two different emission directions, and providing a second image with light directed in another of the at least two different emission directions.

Each of the plurality of cells may include a plurality of light sources arranged in a two-dimensional manner, and each of the plurality of light sources may be controlled independently.

The method may further include adjusting an emission direction of light of at least one of the plurality of cells according to the calculated emission direction by selectively turning ON or OFF each of the plurality of light sources.

Each of the plurality of cells may include at least one selected from the group of a pin hole, a plurality of reflection portions, and any combination thereof.

The backlight unit may include a light guide plate (LGP), and the backlight unit may further include at least one selected from the group of a prism array, a shutter array disposed above the light guide plate (LGP), and any combination thereof.

The method may further include adjusting an emission direction of light of at least one of the plurality of cells according to the calculated emission direction by independently operating at least one selected from the group of prisms of the prism array, shutters of the shutter array, and any combination thereof.

The method may further include determining an orientation of a display apparatus that includes the backlight unit, wherein the providing the first image may further include directing light in the one of the at least two different emission directions according to the determined orientation of the display apparatus, and wherein the providing the second image may further include directing light in the another of the at least two different emission directions according to the determined orientation of the display apparatus.

The orientation of the display apparatus may be determined according to the detection result of a gravity sensor. The orientation of the display apparatus may be determined according to tracking information of a user's right eye and left eye.

In another general aspect, a three-dimensional (3D) display includes a backlight unit, a display panel disposed above the backlight unit, and a sensing unit for determining the orientation of the 3D display, wherein the backlight unit includes a plurality of cells, each of the plurality of cells being able to direct light in a plurality of emission directions, wherein a first image is displayed when the light is directed in a first emission direction of the plurality of emission directions according to an output result of the sensing unit, and wherein a second image is displayed when the light is directed in a second emission direction of the plurality of emission directions according to an output result of the sensing unit.

Other features and aspects may be apparent from the following detailed description, the drawings, and the claims.

Figure 1:
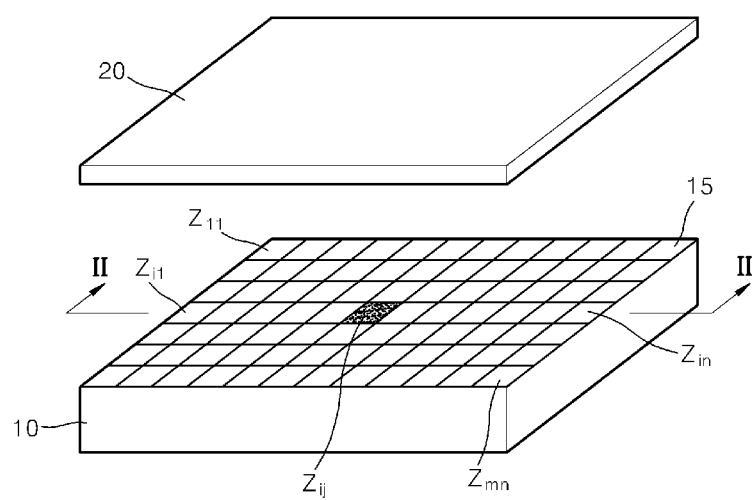
FIG. 1 is a diagram illustrating a schematic view of a three-dimensional (3D) display according to certain examples described herein.

Throughout the drawings and the detailed description, unless otherwise described, the same drawing reference numerals will be understood to refer to the same elements, features, and structures. The relative size and depiction of these elements, as well as the thicknesses of layers and regions, may be exaggerated for clarity, illustration, and convenience.

DETAILED DESCRIPTION

The following detailed description is provided to assist the reader in gaining an understanding of the methods, apparatuses, and/or systems described herein. Accordingly, various changes, modifications, and equivalents of the systems, apparatuses and/or methods described herein may be suggested to those of ordinary skill in the art. Also, descriptions of well-known functions and constructions may be omitted for increased clarity and conciseness.

Specific structural and functional details described herein are merely representative for purposes of describing certain examples. Thus, the features described herein may be embodied in many alternate forms and should not be construed as limited to only the examples set forth herein. Therefore, it should be understood that there is no intent to limit the examples to the particular forms described, but on the contrary, the examples are provided are to cover all modifications, equivalents, and alternatives falling within the scope of the invention.

Although the terms first, second, etc. may be used herein to describe various elements, these elements should not be considered to be limited by these terms. These terms are only used to distinguish one element from another. For example, a first element could be termed a second element, and, similarly, a second element could be termed a first element, without departing from the scope of exemplary embodiments. As used herein, the term "and/or" includes any and all combinations of one or more of the associated listed items.

It will be understood that, if an element is referred to as being "connected" or "coupled" to another element, it can be directly connected, or coupled, to the other element or intervening elements may be present. In contrast, if an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is only for the purpose of describing particular examples and is not intended to be limiting. As used herein, the singular forms "a," "an" and "the" are intended to include the plural forms as well, unless the context clearly indicates otherwise. It will be further understood that the terms "comprises," "comprising," "includes" and/or "including," if used herein, specify the presence of stated features, integers, steps, operations, elements and/or components, but do not preclude the presence or addition of one or more other features, integers, steps, operations, elements, components and/or groups thereof.

Spatially relative terms (e.g., "beneath," "below," "lower," "above," "upper" and the like) may be used herein for ease of description to describe one element or a relationship between a feature and another element or feature as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, for example, the term "below" can encompass both an orientation that is above, as well as, below. The device may be otherwise oriented (rotated 90 degrees or viewed or referenced at other orientations) and the spatially relative descriptors used herein should be interpreted accordingly.

Certain examples are described herein with reference to cross-sectional illustrations that are schematic illustrations of idealized embodiments (and intermediate structures). As such, variations from the shapes of the illustrations as a result, for example, of manufacturing techniques and/or tolerances, may be expected. Thus, the examples should not be construed as limited to the particular shapes of regions illustrated herein but may include deviations in shapes that result, for example, from manufacturing. For example, an implanted region illustrated as a rectangle may have rounded or curved features and/or a gradient (e.g., of implant concentration) at its edges rather than an abrupt change from an implanted region to a non-implanted region. Likewise, a buried region formed by implantation may result in some implantation in the region between the buried region and the surface through which the implantation may take place. Thus, the regions illustrated in the figures are schematic in nature and their shapes do not necessarily illustrate the actual shape of a region of a device and do not limit the scope.

It should also be noted that in some alternative implementations, the functions or operations may occur out of the order noted in the figures. For example, two figures shown in succession may in fact be executed substantially concurrently or may sometimes be executed in the reverse order, depending upon the functions or operations involved.

Unless otherwise defined, all terms (including technical and scientific terms) used herein have the same meaning as commonly understood by one of ordinary skill in the art to which the described examples belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

According to the examples described herein, a three-dimensional (3D) display includes a backlight unit that adjusts a light emission direction to provide a left-eye view area and a right-eye view area separately for a 3D image. FIG. 1 illustrates a schematic view of a 3D display according to certain examples described herein. The 3D display may include a backlight unit 10 and a display panel 20 that may generate an image by using the light emitted from the backlight unit 10. The backlight unit 10 may include a plurality of cells $Z_{11}, \ldots,$ and $Z_{mn}$, and each of the plurality of cells $Z_{11}, \ldots,$ and $Z_{mn}$ includes an emission unit 15 that may adjust a light emission direction of the cell. As an example, the cells $Z_{11}, \ldots,$ and $Z_{mn}$ may be arranged in a two-dimensional manner. The display panel 20 includes a plurality of pixels and generates images according to light transmitted through each of the pixels. As an example, the display panel 20 may be a liquid crystal display (LCD) panel.

Figure 2:
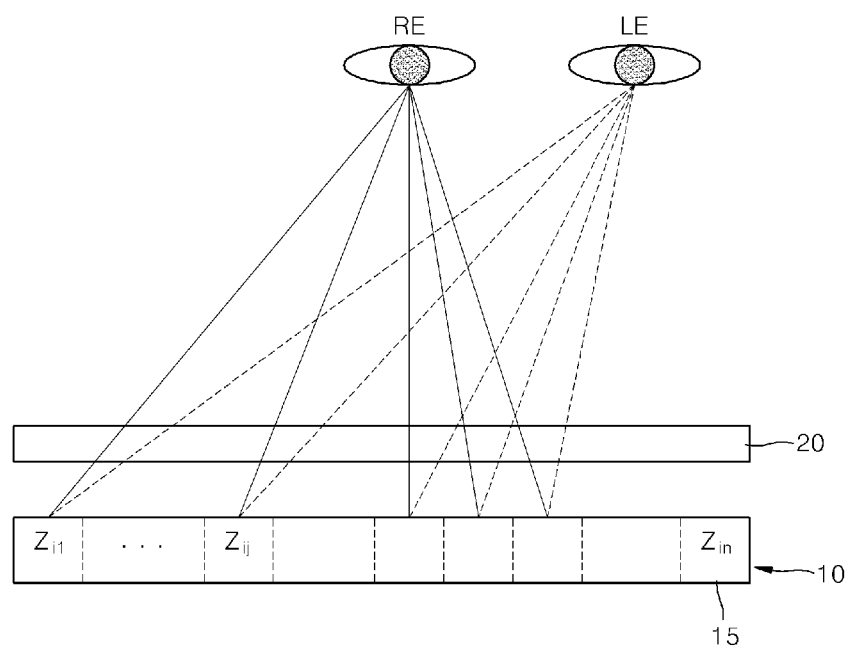
FIG. 2 is a diagram illustrating a cross-sectional view of FIG. 1 taken along a line II-II.

FIG. 2 illustrates a cross-sectional view of FIG. 1 taken along a line II-II. Referring to FIG. 2, the emission unit 15 of each cell $Z_{ij}$ may adjust the light emission direction independently and optionally. Therefore, the light emitted from each cell can be directed to a left eye LE, a right eye RE, or both left and right eyes. When the light is selectively transmitted to the left eye LE or the right eye RE, a 3D image can be generated. On the other hand, when the light is transmitted to both left eye LE and right eye RE, a 2D image can be generated. In this manner, the 3D display illustrated in FIG. 1 can be converted from a 3D display mode to a 2D display mode, and vice versa. Further, the emission unit 15 may adjust the light emission direction in a vertical direction, a horizontal direction, or a diagonal direction. Therefore, the 3D images on the 3D display of the examples described herein may be displayed in various orientations by adjusting the light emission direction of each emission unit 15 independently. For example, the emission unit 15 may be changed from a landscape mode, in which a 3D image can be viewed when a display is disposed in a horizontal direction, to a portrait mode, in which a 3D image can be viewed when a display is disposed in a vertical direction.

In the 3D display illustrated in FIG. 2, a view area of the display may be divided to provide a left-eye image and a right-eye image separately by adjusting the light emission direction of the backlight unit 10. The left-eye image and the right-eye image are displayed sequentially to provide a 3D image while avoiding a reduction in image resolution.

Figure 3:
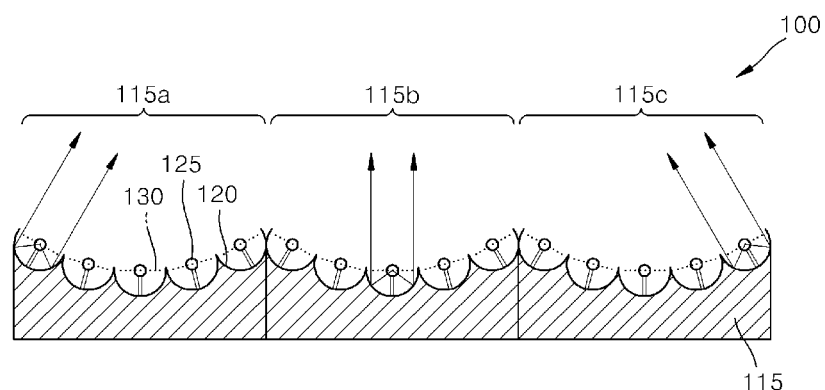
FIG. 3 is a diagram illustrating one example of a backlight unit.

FIG. 3 illustrates an example of a backlight unit 100. The backlight unit 100 of FIG. 3 may include a plurality of cells, and each of the plurality of cell may have an emission unit 115 that adjusts the light emission direction with respect to the emission units of other cells. The plurality of cells may include a first cell 115a, a second cell 115b, and a third cell 115c. The plurality of cells may be arranged in a 2D manner, and each cell may be formed to be substantially square and substantially point symmetric. Further, the number and sizes of cells may be changed according to the size of a display, the number of pixels, resolution, and the like.

The emission unit 115 includes a plurality of reflection portions 120 and a plurality of light sources 125. Each light source 125 may be disposed with respect to a corresponding reflection portion 120, as illustrated in FIG. 3. Each of the reflection portions 120 may have a curved shape and is be formed of a material that reflects light emitted from the light sources 125. Each of the plurality of light sources 125 includes a lighting element (e.g. light emitting diode (LED), an organic light emitting diode (OLED), and the like). The reflection portions 120 may be arranged in a 3D structure within each of the cells 115a, 115b, and 115c. For example, the reflection portions 120 may be arranged in a curved surface as shown in FIG. 3. Since the reflection portions 120 may face different directions from one another, lights reflected by the reflection portions 120 may be directed to different directions. Each of the reflection portions 120 may have a point symmetry structure.

In each of the cells 115a, 115b, and 115c, the light sources 125 may be selectively turned on or off; thus, the light emission direction of the light from each cell can be changed. For example, to achieve a certain light emission direction, a first light source may be turned on in the first cell 115a, a third light source may be turned on in the second cell 115b, and a fifth light source may be turned on in the third cell 115c as illustrated in FIG. 3. Thus, the light emission direction in each of the cells may be adjusted independently. The light emission direction of each of the cells 115a, 115b, and 115c may be set according to the position of a light source 125 which is turned on. A control unit (not shown) of a display may have information regarding light sources 125 and corresponding light emission directions in each of the cells 115a, 115b, and 115c. According to the above example, the light emission directions of the cells 115a, 115b, and 115c are based on the arrangement of the reflection portions 120. Further, the light emission directions may be controlled in various directions, including a vertical direction, a horizontal direction, a diagonal direction, and the like.

The reflection portions 120 may be paraboloidal mirrors in which a light source 125 is located at the focus of a corresponding reflection portion 120, and thus light emitted from any light source 125 is reflected and collimated by the corresponding reflection portion 120, due to the parabolic shape. Centers of the light sources 125 disposed within the corresponding reflection portions 120 may be connected by a virtual line 130. Virtual line 130 may be disposed as a curved line. Accordingly, the light emission direction may be adjusted based on the positions of the light sources 125 that are turned on and the orientations of the corresponding reflection portions 120. Light emitted from the cells may be transmitted in a corresponding left-eye direction and a corresponding right-eye direction to provide a 3D image.

According to the above example, the 3D image may be displayed without reducing the resolution of the observed image by displaying the left-eye image and the right-eye image in a temporal sequence. In other words, the light sources 125 may be selectively turned on in each of the cells of the backlight unit 100 to provide an emission light in the left-eye direction only, and thus only a left-eye image is formed in a display panel for a first frame. For a second frame, the light sources 125 may be selectively turned on in each of the cells of the backlight unit 100 to provide an emission light in a right-eye direction only, and thus only a right-eye image is formed in the display panel for the second frame.

According to the above example, a 2D image may be displayed on the 3D display by turning on the light sources 125 disposed in the same position in each of the cells, for example the light sources that are positioned in the center of each of the cells and provide light into a direction substantially perpendicular to the display panel. Therefore, the image formed on the display may be converted from 3D to 2D and vice versa by adjusting the light emission direction in each of the cells.

Figure 4:
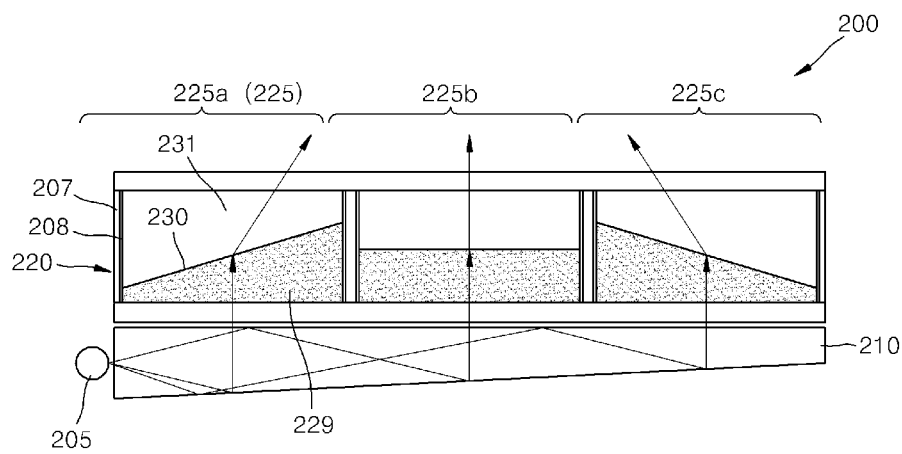
FIG. 4 is a diagram illustrating another example of a backlight unit.

FIG. 4 illustrates another example of a backlight unit 200. Referring to FIG. 4, the backlight unit 200 includes a light source 205, a light guide plate (LGP) 210 guiding light emitted from the light source 205, and a prism array 220 disposed above the LGP 210. The prism array 220 operates as an emission unit to adjust the light emission direction of the light guided by the LGP 210. The light source 205 may be a cold cathode fluorescent lamp (CCFL), a light emitting diode (LED), an organic light emitting diode (OLED), or the like. The LGP 210 guides light emitted from the light source 205 towards the prism array 220. The LGP 210 may collimate lights from a point light source or linear light source and may provide a surface light source for the prism array 220. The LGP 210 may have a wedge shape, as illustrated in FIG. 4, so as to facilitate collimation of light. Further, the LGP 210 may include prism patterns disposed on a top surface or a bottom surface to facilitate collimation of the light emitted from the light source 205. The prism patterns may be formed on the LGP 210 through one of well-known technologies in the industries, or through a process specially designed for implementing the above-described features.

According to the above example, the prism array 220 disposed on the LGP 210 is divided into cells 225. A prism in each cell includes a refraction surface 230 whose inclination may be adjusted by an electrical signal. Therefore, the emission direction of light from each cell may be adjusted by changing the inclination of the refractive surface 230 of the prism located in the cell. For example, the cells 225 include a first cell 225a, a second cell 225b, and a third cell 225c. The refraction surfaces 230 in the first cell 225a, the second cell 225b, and the third cell 225c may be adjusted independently to control light emission directions of the lights from the first, second and third cells separately. The controlled light emission directions may be directed to a left eye view or a right eye view, and thus a 3D image may be displayed.

The prism array 220, for example, may include an electric wetting device. The cells of the prism array 220 may be divided by electrodes 207. A polarizable liquid 229 (e.g. water) and a nonpolar liquid 231 (e.g. oil) may be filled between the electrodes 207. A boundary surface formed between the polarizable liquid 229 and the nonpolar liquid 231 acts as a refraction surface 230. A dielectric layer 208 may be disposed on inner walls of the electrodes 207. The dielectric layer 208 has a hydrophobic surface formed by coating a hydrophobic thin film on a top surface of the dielectric layer or by using a hydrophobic dielectric layer. According to the above example, the polarizable liquid 229 may be inclined at a high contact angle with the dielectric layer 208 when voltage is not applied to the electrodes 207. On the other hand, the contact angle between the dielectric layer 208 and the polarizable liquid 229 is decreased when voltage is applied to the electrodes 207. Therefore, the inclination of each refraction surface 230 can be adjusted by the electrical voltage. The variation of inclination of the refractive surface 230 changes the light emission direction of the light from the cell. Accordingly, the light emission direction may be adjusted by the voltage supply to the electrodes 207 where the voltage supply can be controlled by ON and OFF switching process or by controlling magnitudes of voltage. The mechanism for adjusting the light emission directions of the cell in this example is not limited to the principle of electric wetting. For example, the light emission direction may also be adjusted by using a liquid crystal when an image is formed by using polarized light. In the liquid crystal, the arrangement of liquid crystal molecules is varied according to the size/strength of an electric field formed by applied voltages, which provides a variation of the refractivity of the liquid crystal.

According to the example illustrated in FIG. 4, the light emission direction may be adjusted according to magnitudes and directions of the voltages applied to the prism array 220. For example, a light emission at a first time t1 may be transmitted in a left eye direction, and a light emission at a second time t2 may be transmitted in a right eye direction by adjusting the applied voltages, thereby providing a 3D image. Since the left-eye image and the right-eye image may be displayed sequentially, the 3D image can be displayed without reducing the resolution of the displayed image. A 2D image may also be displayed in the 3D display by adjusting the light emission direction in each of the cells in such a way that light emitted from each of the cells is directed in substantially the same direction, such as perpendicular to the front side of a display panel placed above the backlight unit 200. Thus, the display mode of the 3D display according to the above example can be switched from a 3D display mode to a 2D display and vice versa.

Figure 5:
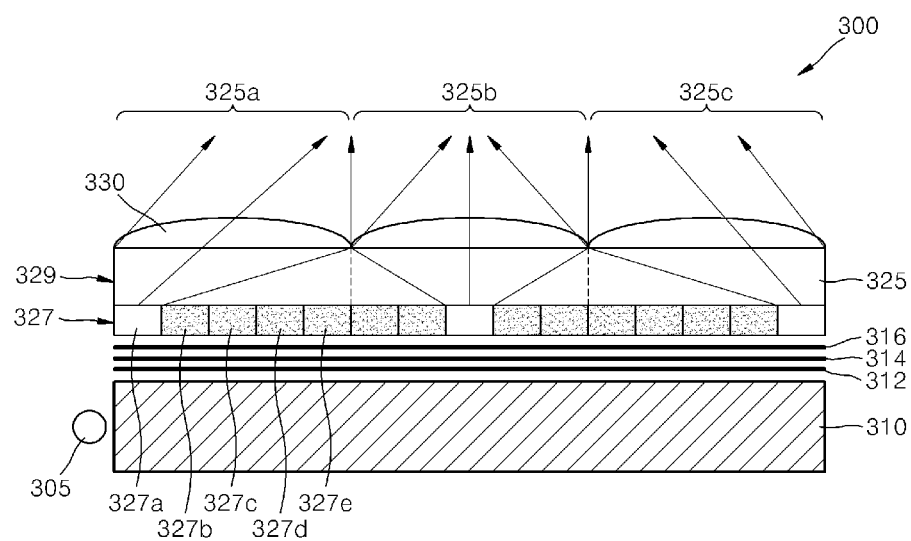
FIG. 5 is a diagram illustrating another example of a backlight unit.

FIG. 5 illustrates another example of a backlight unit 300. Referring to FIG. 5, the backlight unit 300 includes a plurality of cells, and each of the cells includes an emission unit 325 that adjusts the direction of light emitted from the corresponding cell. The emission unit 325 includes a light array selectively transmitting light and a direction adjusting portion for controlling emission direction of the light emitted from the light array. The light array may include a light source 305, an LGP 310 that guides light emitted from the light source 305, and a shutter array 327 disposed over the LGP 310. A lens array 330 disposed over the shutter array 327 may control the direction of light passed through the shutter array 327.

The light source 305 may be a CCFL, an LED, an OLED, or the like. The LGP 310 may include scattering emission patterns.

According to the example illustrated in FIG. 5, the shutter array 327 may include a plurality of shutters for each of the cells. The plurality of shutters in each cell may be arranged in a 2D manner, and each cell may be formed to be substantially square and substantially point symmetric. For example, the shutter array 327 may include first through fifth shutters 327*a*, 327*b*, 327*c*, 327*d*, and 327*e* in the first cell 325*a*. The first through fifth shutters 327*a*, 327*b*, 327*c*, 327*d*, and 327*e* may be formed as a liquid crystal shutter, an electric wetting shutter, a frustrated total internal reflection (FTIR) shutter (hereinafter, referred to as an FTIR shutter), and the like. The FTIR shutter may be employed to reduce power consumption, as compared to other shutters, by recycling light.

The lens array 330 may include a plurality of lenses corresponding to each of the cells, and the shutter array 327 may be disposed on a focal plane of the lens array 330. For example, when the cells are arranged in a 2D manner, the lens array 330 may also be arranged in a 2D manner. A space layer 329 may be further formed between the lens array 330 and the shutter array 327 so as to separate the lens array 330 from the shutter array 327 by a distance substantially equal to a focal length of the lens. The space layer 329 may be formed of a material having the same or a similar refractive index as that of the lens array 330 or of the space layer 329. Also, the lens array 330 may form a unitary body made from the same or similar lens material. According to the example illustrated in FIG. 5, the backlight unit 300 may further include a diffusion plate 312 that substantially uniformly disperses light emitted from the LGP 310, a prism sheet 314 that alters a light proceeding path, and/or a brightness enhancement film 316. Diffusion plate 312, prism sheet 314, and brightness enhancement film 316 may each be disposed between the shutter array 327 and the LGP 310.

According to the example illustrated in FIG. 5, light emitted from the light source 305 (e.g. substantially a point or line light source) is converted to a planar slight source by dispersing the light over a surface of the backlight unit 300 through the LGP 310. Light emitted from the LGP 310 may be controlled by ON and OFF switching operations of the shutter array 327. The direction of light passed through the shutter array 327 may vary according to positions of the opened shutters in the cells and interactions with the lens array 330. For example, when the first shutter 327*a* is opened and the remaining second through fifth shutters 327*b*, 327*c*, 327*d*, and 327*e* are closed in the first cell 325*a*, the light controlled by the shutter array 327 is directed in an upward-right direction as illustrated in FIG. 5. On the other hand, when the fifth shutter 327*e* is opened and the remaining first through fourth shutters 327*a*, 327*b*, 327*c*, and 327*d* are closed as shown in the third cell 325*c* of FIG. 5, the light is directed in an upward-left direction. When the third shutter 327*c* is opened and the remaining first, second, fourth, and fifth shutters 327*a*, 327*b*, 327*d*, and 327*e* are closed as illustrated in the second cell 325*b* of FIG. 5, the light is directed in a substantially upward/vertical direction. Therefore, a 3D image can be displayed with a left-eye view area and a right-eye view area, which are each obtained by adjusting the emission direction of light in each of the cells. According to the example illustrated in FIG. 5, the emission direction of light from each cell may be adjusted independently and controlled in various directions, according to different combinations of the position of the opened shutter and the position of lens corresponding to the opened shutters. When the shutter array 327 of the above example is arranged in a 2D manner, the light emission direction may be freely adjusted in vertical and horizontal directions as well as right and left directions, relative to an initial orientation of the display. Accordingly, a display having the backlight unit 300 may display 3D images in various orientations including a portrait display method and a landscape display method. Further, by displaying a left-eye image and a right-eye image in a temporal sequence, the 3D image may be displayed without reducing the resolution of the observed image.

According to the example illustrated in FIG. 5, a 2D image may also be provided in a display by adjusting the emission direction of light from the cells by controlling the positions of the opened shutter in the backlight unit 300. For example, by opening all of shutters of the shutter array 327 or by opening shutters in the same position in each of the cells, a 2D image may be displayed. In this manner, an image on the display may be converted from a 2D image to a 3D image and vice versa by controlling the opened shutters of the shutter array 327.

Figure 6:
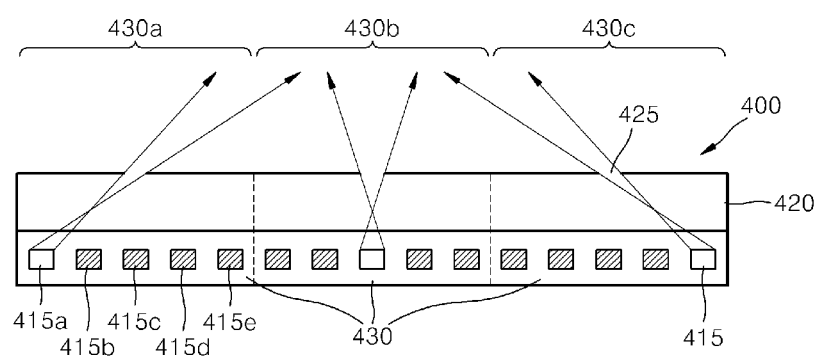
FIG. 6 is a diagram illustrating another example of a backlight unit.

FIG. 6 illustrates another example of a backlight unit 400. Referring to FIG. 6, the backlight unit 400 includes a plurality of cells 430, and each of the cells includes an emission unit 420 that adjusts a light emission direction with respect to each of the cells 430. The emission unit 420 includes a light source array 415, in which a plurality of light sources are arranged, and a pin hole 425 disposed over the light source array 415. The light source array 415 may include an LED or OLED. One pin hole 425 may be formed for each of the cells 430. The light source array 415 may be implemented as a light array in which each of light sources may be turned ON or OFF. In comparison with the backlight unit 300 shown in FIG. 5, the light source 305, the LGP 310, and the shutter array 327 of the backlight unit 300 may be replaced with the light source array 415 of FIG. 6, and the light source array 415 provides an array of light emissions. The light source array 415 may be arranged in a 2D manner, and each cell may be formed to be substantially square and substantially point symmetric. As an example, the light source array 415 may include a plurality of light sources, a first through a fifth light source 415*a*, 415*b*, 415*c*, 415*d*, and 415*e*. According to the example illustrated in FIG. 6, a light emission direction of each cell may be controlled by a position of a light source that is turned ON, being one of the first through fifth light sources 415*a*, 415*b*, 415*c*, 415*d*, and 415*e* of the light source array 415, and the pin hole 425 of the cell, which affects the direction of light emitted from the turned ON light source.

For example, the plurality of cells 430 may include a first cell 430*a*, a second cell 430*b*, and a third cell 430*c*. When the first light source 415*a* of the first cell 430*a* is turned ON and the remaining second through fifth light sources 415b, 415c, 415d, and 415e are turned OFF in the first cell 430a, light emitted from the first light source 415a is directed in an upward-right direction the pin hole 425 of the first cell 430a as illustrated in FIG. 6. On the other hand, when the fifth light source 415e is turned ON and the remaining first through fourth light sources 415a, 415b, 415c, and 415d are turned OFF as shown in the third cell 430c of FIG. 6, light emitted from the fifth light source is directed in an upward-left direction through the pin hole 425 of the third cell 430c. When the third light source 415c is turned ON and the remaining first, second, fourth, and fifth light sources 415a, 415b, 415d, and 415e are turned OFF as show in the second cell 430b of FIG. 6, light emitted from the third light source 415c is directed in a substantially upward/vertical direction via the pin hole 425 of the second cell 430b. According to the example illustrated FIG. 6, the emission direction of light from each cell may be adjusted independently and controlled in various directions. For example, light may be transmitted to the right eye or left eye according to the light emission direction, which is determined according to the position of a turned-ON light source in each of the cells in relation to the pin hole 425. In other words, light emitted from each cell may be transmitted in a desired direction by selectively operating the light sources based on the relative positions of the light sources with respect to the pin hole 425. Therefore, a 3D image may be displayed with images provided into the left and right eyes sequentially by adjusting the light emission directions from the cells. Furthermore, in the backlight unit 400, two or more light sources may be simultaneously turned ON in the light source array 415 in each of the cells, according to desired operation.

According to the example illustrated in FIG. 6, a 2D image may be displayed by turning ON the light sources in the cells in such a manner that the turned ON light sources are each in substantially the same position. Therefore, a display having the backlight unit 400 may be convert an image from a 2D image to 3D image by adjusting the position of the turn-ON light sources arranged in the light source array 415. According to the above example, an entire area of the display panel may be used to display either the left-eye image or the right-eye image, and thus a 3D image may be displayed without reducing the resolution of the observed image.

According to the above examples, an emission unit of the backlight unit adjusts a light emission direction of each of a plurality of cells to form a 3D image. For example, the backlight unit 300 illustrated in FIG. 5 includes a plurality of cells 325a, 325b, and 325c. A light emission direction with respect to each shutter in each cell can be estimated based on an emission angle of the light passing through the shutter when it is opened. According to the estimated relationship between the light emission direction and the location of each shutter in the shutter array 327, the emission unit may direct light from each cell in a left eye direction or in a right eye direction, thereby generating a 3D image. The method of adjusting light emission direction of each cell based on the estimated relationship between a light emission direction and a location of each shutter in the backlight unit 300 may be similarly applied in other backlight units 100, 200, 200 and 400.

According to the examples described above, a display may display images of two or more views by increasing a refresh rate. A screen in one period may be referred to as one frame, and a scanning speed corresponding to a screen of each view included in one frame may be referred to as a refresh rate. For example, when a frequency for one frame is 60 Hz, four views for the frame may be provided with a refresh rate of 240 Hz or higher. A 3D image with four views may be displayed by adjusting the refresh rate while transmitting backlight into a desired light emission direction for each view (i.e. either for left eye or right eye) at a speed corresponding to the refresh rate. The number of views may be higher than four views, and thus a 3D image according to the embodiments of the present invention may also be displayed with a various number of views.

Further according to the above examples, if the number of views is greater than two views, two or more 3D images may be generated. For example, 3D images may be generated for two or more users, or a single user may view 3D images from various perspectives or angles. As an additional example, 3D images may be generated by various combinations of the images viewed by a right eye RE and a left eye LE. For example, an image viewed by a right eye RE may be combined with a variety of images viewed by left eye LE to generate various 3D images. As another example, if a first image viewed by a right eye RE is combined with a second image viewed by left eye LE to generate a first perspective or first angle of a 3D image, the second image may be viewed by right eye RE and combined with a third image viewed by left eye LE to generate a second perspective or second angle of the 3D image.

Figure 7:
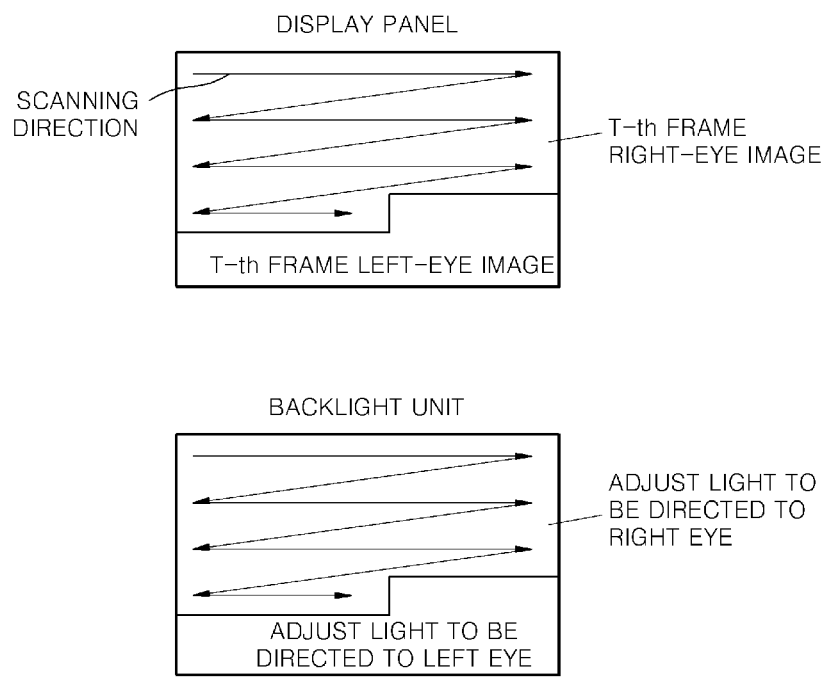
FIG. 7 is a diagram illustrating an example of operation of a backlight unit synchronized with a display panel.

FIG. 7 illustrates an example of operation of a backlight unit synchronized with a display panel. If the display panel is driven using a thin film transistor (TFT) in an active matrix (AM) or passive matrix (PM) method, all pixels of the display panel may not be capable of displaying a frame simultaneously, but instead display the frame in a scanning manner. Thus, a left-eye image and a right-eye image may be mixed and displayed together. If the light emission direction of the backlight unit is only either for the left-eye-image or for the right-eye image, cross-talk issues may arise. In order to reduce cross-talk, a light emission direction of the backlight unit may be adjusted in synchronization with scanning of the display panel. For example, when the T-th frame of the right-eye image as illustrated in FIG. 7 is formed in an upper region of the display panel and the T-th frame of the left-eye image is formed in a lower region of the display panel, light emitted from a corresponding upper region of the backlight unit may be adjusted to be directed to the right eye, and light emitted from a corresponding lower region of the backlight unit may be adjusted to be directed to the left eye.

Figure 8A:
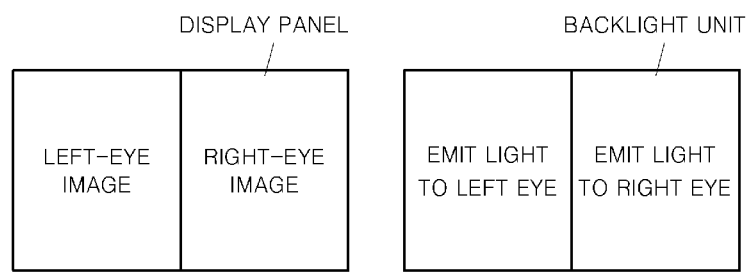
FIGS. 8A and 8B are diagrams illustrating another example of operation of a backlight unit synchronized with a display panel.
Figure 8B:
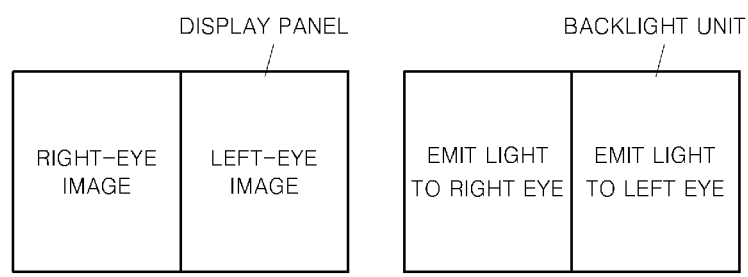

FIGS. 8A and 8B illustrate another example of operation of a backlight unit synchronized with a display panel. As illustrated in FIG. 8A, the display panel may be divided into a left region and a right region. At a first time t1, a left-eye image may be formed in the left region, and a right-eye image may be formed in the right region. The light emission direction of the backlight unit may be provided in such a way that light emitted from a left region of the backlight unit, corresponding to the left-eye image displayed on the left region of the display panel, may be directed into the left eye, and light emitted from a right region of the backlight unit, corresponding to the right-eye image display on the right region of the display panel, may be directed into the right eye. Thus, cross-talk caused by image mixing of the left-eye image and the right-eye image according to the scanning direction of the display panel may be reduced.

On the other hand, the right-eye image may be formed in the left region of the display panel as illustrated in FIG. 8B, and the left-eye image may be formed in the right region of the display panel. In this case, the light emission direction of the backlight unit may be adjusted to accommodate the position of the left-eye image and right-eye images on the display panel in such a way that light emitted from the left region of the backlight unit may be directed into the right eye to illuminate the right-eye image displayed on the left region of the display panel, and light emitted from the right region of the backlight unit may be directed into the left eye to illuminate the left-eye image displayed on the right region of the display panel. In this manner, the left-eye image and the right-eye image are switched their positions on the display panel, as compared to their positions in FIG. 8A, without reducing resolution.

According to the above examples, brightness and/or ON/OFF time ratio of the light sources in each of cells of the backlight unit may be adjusted in order to control the light emission directions of the divided regions (i.e. right region and left region) as shown in FIGS. 8A and 8B. For example, the backlight unit 400 of FIG. 6 may provide light in two different emission directions by adjusting the brightness of light sources in each cell 430 and/or the turn ON/OFF time ratio of the light source with respect to adjacent light sources arranged in the light source array 415.

According to the above examples, the light emission direction of the backlight unit may be estimated based on an orientation of a display and/or positions of the viewer's eyes. As one example, the orientation of the display may be detected, and the light emission direction of the backlight may be adjusted based on the detected orientation information in order to change a display mode of the display. As another example, the light emission direction of the backlight may be adjusted based on the tracking information of positions of the viewer's eyes.

Figure 9:
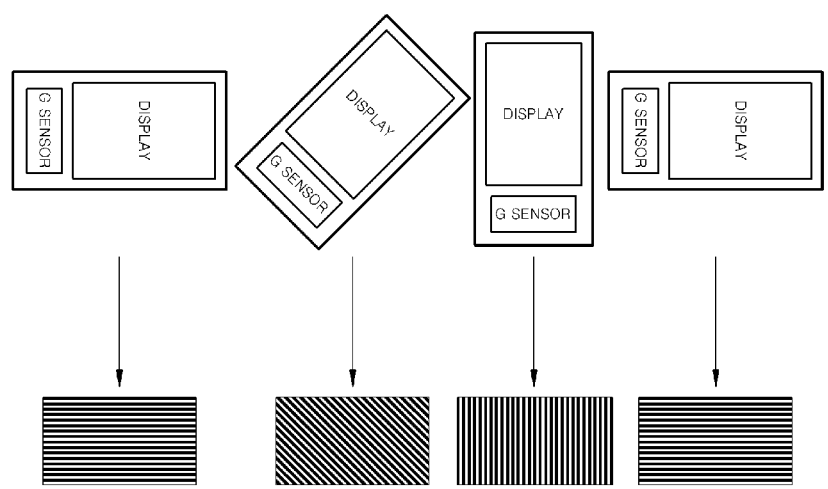
FIG. 9 is a diagram illustrating examples of different light emission directions of the display at various orientations of the display.

FIG. 9 illustrates different light emission directions of the display at various orientations of the display. For example, FIG. 9 illustrates patterns corresponding to opening/closing signals of the shutter array 327 of the backlight unit 300 illustrated in FIG. 5. The position of the display may be detected using a gravity (G) sensor, for example. The G sensor may detect the direction of the gravity on the display, and thereby determine the position/orientation of the display. The display may include information regarding a screen display direction according to the position of the display. When a position change of the display is detected by the G sensor, the display recognizes the screen display direction corresponding to the new orientation of the display. The backlight unit may adjust the light emission direction with the recognized new screen display direction, and thereby conversion of the display mode may occur.

Figure 10:
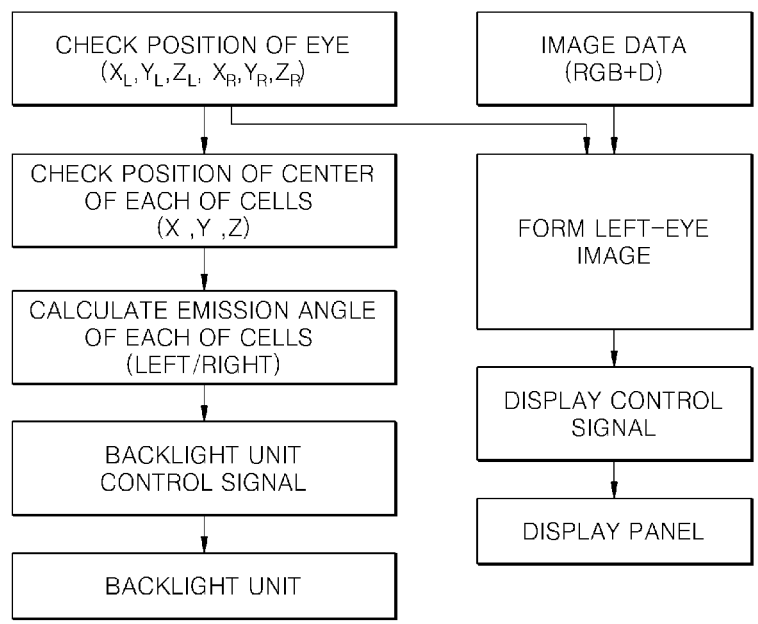
FIG. 10 is a flowchart illustrating procedures for adjusting a light emission direction of the display based on tracking information of a user's eyes.

FIG. 10 illustrates procedures for adjusting a light emission direction based on tracking information of a user's eyes. First, the positions of the eyes of the viewer are determined, and the center position of each of the cells in the backlight unit is checked. For example, the positions of the eyes of the viewer may be determined using a camera directed towards the user. A light emission angle of each of the cells is calculated according to the position of the left eye $X_L, Y_L, Z_L$ and the position of the right eye $X_R, Y_R, Z_R$. A control signal is sent to the backlight unit to control an emission unit of each of the cells. For example, the control signal may turn ON/OFF light sources of each of the cells, may open/close shutters in a shutter array, or may change the level of voltage supplied to each of the cells.

A left-eye image and a right-eye image are formed according to image data. The image data may include data such as color data RGB and depth data D. The image data may include 3D image data as well as 2D image data. Here, a 3D image will be described. A display control signal is transmitted to a display panel according to left-eye image data and right-eye image data, thereby forming the left-eye image and the right-eye image. The left-eye image and the right-eye image may be formed simultaneously or sequentially. For the left-eye image, the emission unit of the backlight unit may provide light to be directed toward the left eye. For the right-eye image, the emission unit of the backlight unit allows light to be directed toward the right eye, and thereby a 3D image is formed when both the left-eye image and the right-eye image are viewed.

In addition to the automatic eye tracking, a user may designate the light emission direction by arbitrarily selecting an emission mode. For example, when the available emission modes include a front emission mode, a left emission mode, and a right emission mode, the user may select the front emission mode in which the view of the images on the display may be restricted to the user only and not visible to other people.

While certain examples have been described above, it should be apparent that modifications and variations thereto are possible, all of which fall within the spirit and scope of the invention. With respect to the above descriptions, it should be recognized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims.

Therefore, the foregoing is considered as illustrative only of the principles of the invention. Further, since numerous modifications and changes will be apparent to those skilled in the art, it is not desired to limit the invention to the exact construction and operation shown and described, and accordingly, all suitable modifications and equivalent are intended to fall within the scope of the invention as claimed.

What is claimed is:

1. A backlight unit comprising:
cells, each cell including
reflection portions, and
light sources disposed along a curved line within the cell,
wherein each light source is disposed apart from a corresponding reflection portion, and wherein each light source is disposed between the corresponding reflection portion and a viewer;
wherein each cell is configured to direct light in two or more emission directions,
wherein a first image is displayed when the light is directed in one of the two or more emission directions, and
wherein a second image is displayed when the light is directed in another of the two or more emission directions,
wherein each cell controls the emission direction according to a location of a light source turned on.

2. The backlight unit of claim 1, wherein the light sources are arranged in an array.

3. The backlight unit of claim 1, wherein each light source is controlled independently.

4. The backlight unit of claim 1, wherein the reflection portions are arranged on a curved surface.

5. A backlight unit comprising:
cells, each cell including:
light sources aligned vertically and horizontally in a two dimensional array, and
a pin hole configured to affect an emission direction of light emitted from at least one light source;
wherein each cell is configured to direct light in two or more emission directions;

wherein each cell controls the emission direction according to a location of a light source turned on and a location of the corresponding pin hole of each cell;
wherein a first image is displayed when the light is directed in one of the two or more emission directions, and
wherein a second image is displayed when the light is directed in another of the two or more emission directions.

6. The backlight unit of claim 5, wherein the pin hole in each cell affects an emission direction of light emitted from each light source, and each of the emission directions of the light sources are different from one another.

7. A backlight unit comprising:
a light guide plate (LGP);
a light source configured to emit light into a surface of the LGP; and
cells, wherein each cell is independently configured to direct light in two or more emission directions by use of a prism disposed in the cell and above the light guide plate (LGP), wherein each prism comprises a refraction surface with an inclination surface, and wherein each prism is adjusted by using an electrical signal;
wherein a first image is displayed when the light is directed in one of the two or more emission directions,
wherein a second image is displayed when the light is directed in another of the two or more emission directions.

8. The backlight unit of claim 7, wherein the LGP is formed in a wedge shape.

9. The backlight unit of claim 7, wherein the prism comprises an electric wetting device.

10. The backlight unit of claim 7, wherein each cell further includes a shutter array disposed between the LGP and a display panel.

11. The backlight unit of claim 10, wherein the shutter array comprises at least one selected from the group of an electric wetting shutter, a liquid crystal shutter, a frustrated total internal reflection (FTIR) shutter, and any combination of thereof.

12. A backlight unit comprising:
a light source;
a light plate; and
cells, each cell comprising a shutter array disposed above the light guide plate,
wherein each shutter is configured to open or close independently;
wherein each cell is configured to direct light in a first emission direction and a second emission direction, and
wherein an emission direction is determined by a location of an open shutter.

13. A three-dimensional (3D) display comprising:
a backlight unit and a display panel disposed above the backlight unit, wherein the backlight unit includes cells, each cell including reflection portions, and
light sources disposed along a curved line within the cell, wherein each light source is disposed apart from a corresponding reflection portion, and is disposed between the corresponding reflection portion and a viewer;
wherein each cell is configured to direct light in two or more emission directions,
wherein a first image is displayed when the light is directed in a first emission direction of the two or more emission directions, and
wherein a second image is displayed when the light is directed in a second emission direction of the two or more emission directions,
wherein each cell controls the emission direction according to a location of a light source turned on.

14. The three-dimensional display of claim 13, wherein each light source is controlled independently.

15. A three-dimensional (3D) display comprising:
a backlight unit and a display panel disposed above the backlight unit,
wherein the backlight unit includes cells, each cell including
light sources aligned vertically and horizontally in a two dimensional array, and
a pin hole configured to affect an emission direction of light emitted from at least one light source;
wherein each cell is configured to direct light in two or more emission directions,
wherein each cell controls the emission direction according to a location of the light source turned on and the corresponding pin hole of each cell;
wherein a first image is displayed when the light is directed in a first emission direction of the two or more emission directions, and
wherein a second image is displayed when the light is directed in a second emission direction of the two or more emission directions.

16. A method of forming a three-dimensional (3D) image, the method comprising:
calculating an emission direction of light of each of cells in a backlight unit, wherein each cell is configured to direct light in at least two different emission directions;
providing a first image with light directed in an emission direction;
providing a second image with light directed in another emission direction, wherein each cell includes
reflection portions, and
light sources disposed along a curved line within the cell, wherein each light source is disposed apart from a corresponding reflection portion, and between the corresponding reflection portion and a viewer;
wherein each cell controls the emission direction according to a location of a light source turned on.

17. The method of claim 16, wherein each cell includes light sources arranged in an array, and each light source is controlled independently.

18. The method of claim 17, further comprising:
adjusting an emission direction of light of at least one of the cells according to the calculated emission direction by selectively turning ON or OFF each light source.

19. The method of claim 16, further comprising:
determining an orientation of a display apparatus that includes the backlight unit,
wherein the providing the first image further comprises directing light in the emission direction according to the determined orientation of the display apparatus, and
wherein the providing the second image further comprises directing light in the another of the emission directions according to the determined orientation of the display apparatus.

20. The method of claim 19, wherein the orientation of the display apparatus is determined according to the detection result of a gravity sensor.

21. The method of claim 19, wherein the orientation of the display apparatus is determined according to tracking information of a user's right eye and left eye.

22. A three-dimensional (3D) display comprising:
a backlight unit;
a display panel disposed above the backlight unit; and
a sensor to determine the orientation of the 3D display, wherein the backlight unit includes cells, each cell including
reflection portions, and
light sources disposed along a curved line within the cell, wherein each light source is disposed apart from a corresponding reflection portion, and between the corresponding reflection portion and a viewer;
wherein each cell is configured to direct light in a plurality of emission directions,
wherein a first image is displayed when the light is directed in a first emission direction of the emission directions, according to an output result of the sensor,
wherein a second image is displayed when the light is directed in a second emission direction of the emission directions, according to an output result of the sensor, and
wherein each cell controls the emission direction according to a location of a light source turned on.

* * * * *